United States Patent
Ohashi et al.

(10) Patent No.: US 12,126,983 B2
(45) Date of Patent: Oct. 22, 2024

(54) CONTROL DEVICE, PROCESSING METHOD FOR CONTROL DEVICE, AND STORAGE MEDIUM STORING PROGRAM FOR PROCESSING METHOD

(71) Applicant: PANASONIC INTELLECTUAL PROPERTY MANAGEMENT CO., LTD., Osaka (JP)

(72) Inventors: Hiromasa Ohashi, Osaka (JP); Naoya Tanaka, Osaka (JP); Ryo Hirota, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 183 days.

(21) Appl. No.: 17/967,471

(22) Filed: Oct. 17, 2022

(65) Prior Publication Data

US 2023/0037195 A1 Feb. 2, 2023

Related U.S. Application Data

(63) Continuation of application No. PCT/JP2021/015526, filed on Apr. 15, 2021.

(30) Foreign Application Priority Data

Apr. 28, 2020 (JP) .................... 2020-078890

(51) Int. Cl.
H04S 7/00 (2006.01)
H04R 5/04 (2006.01)

(52) U.S. Cl.
CPC ............... *H04S 7/301* (2013.01); *H04R 5/04* (2013.01); *H04S 7/302* (2013.01)

(58) Field of Classification Search
CPC ................................. H04S 7/301; H04S 7/302
See application file for complete search history.

(56) References Cited

U.S. PATENT DOCUMENTS 10,924,853 B1 * 2/2021 Curtis .................. H04R 29/002
2004/0125044 A1 7/2004 Suzuki

FOREIGN PATENT DOCUMENTS

| JP | 2005-099064 | 4/2005 |
| JP | 2007-180662 | 7/2007 |
| JP | 2016-092779 | 5/2016 |

OTHER PUBLICATIONS

International Search Report issued in International Pat. Appl. No. PCT/JP2021/015526, dated Jun. 29, 2021, along with an English translation thereof, 4 pages.

* cited by examiner

*Primary Examiner* — Ping Lee
(74) *Attorney, Agent, or Firm* — GREENBLUM & BERNSTEIN, P.L.C.

(57) ABSTRACT

A control device controls sound of a plurality of speakers. The control device includes: a generation unit acquiring image data and generates display image data from the image data by using conversion processing using shape information indicating a shape of a display surface; a display controller displaying a display image on the display surface by using the display image data; a receiver causing a cursor to be superimposed and displayed on the display image and receives position designation related to the plurality of speakers on the display image from a user who has visually recognized the cursor; and an identification unit calculating a position of the cursor from the position designation by referring to a correspondence relationship between the image data before the conversion processing and the display image data after the conversion processing, and identifying the position of the cursor as a position related to the plurality of speakers.

9 Claims, 14 Drawing Sheets

CONTROL DEVICE, PROCESSING METHOD FOR CONTROL DEVICE, AND STORAGE MEDIUM STORING PROGRAM FOR PROCESSING METHOD

BACKGROUND

1. Technical Field

The present disclosure relates to a control device, a processing method for the control device, and a program.

2. Description of the Related Art

There is a system that presents stereophonic sound with a plurality of speakers. The stereophonic sound is a concept indicating overall sound processing for causing a viewer to perceive a stereoscopic sound image having a sense of direction.

The system enables the user to feel realistic by presenting a video of a relatively wide range surrounding the user while providing stereophonic sound.

This kind of system determines a drive sound source signal to be supplied to each speaker based on positions of the plurality of speakers disposed in a space. Alternatively, a virtual speaker virtually constituted by a plurality of speakers may be used.

A conventional system using a plurality of display devices has a technique for effectively outputting an image and sound (see Patent Literature (PTL) 1).

PTL 1 is Unexamined Japanese Patent Publication No. 2005-99064.

SUMMARY

Unfortunately, it is difficult to acquire position information on a plurality of speakers viewed from a viewing position, the position information being necessary for determining the sound (i.e., the drive sound source signal) output from each speaker. When the virtual speaker is formed, it is difficult to acquire position information on the virtual speaker viewed from a viewing position, the information being necessary for position designation of the virtual speaker. This is because when the viewing position changes, the position information on the plurality of speakers viewed from the viewing position also changes. Here, the viewing position is a position at which the user is assumed to view the stereophonic sound. As described above, there is a problem that it is difficult to acquire a position related to the plurality of speakers used for presenting stereophonic sound.

Thus, the present disclosure provides a control device or the like that more easily acquires position information on a plurality of speakers used for presenting sound.

A control device in the present disclosure controls sound to be presented to a user with a plurality of speakers disposed in a space. The control device includes: a generation unit that acquires image data to be displayed on a display surface and generates display image data from the acquired image data by using conversion processing using shape information indicating a shape of the display surface; a display controller that displays a display image on the display surface by using the display image data generated by the generation unit; a receiver that causes a cursor to be superimposed and displayed on the display image displayed, and receives position designation related to the plurality of speakers on the display image from the user who has visually recognized the cursor; and an identification unit that calculates a position of the cursor in the space from the position designation of the user by referring to a correspondence relationship between the image data before the conversion processing and the display image data after the conversion processing, and that identifies the calculated position of the cursor as a position related to the plurality of speakers.

The control device of the present disclosure can more easily acquire the position information on the plurality of speakers used for presenting the sound.

DETAILED DESCRIPTION

Hereinafter, exemplary embodiments will be described in detail with appropriate reference to the drawings. However, unnecessarily detailed description may be omitted. For example, detailed explanations on the matters that are already well known, and redundant explanations about the configurations that are substantially identical will be sometimes omitted. This is to avoid an unnecessarily redundant description below and to facilitate understanding of a person skilled in the art.

The inventors of the present disclosure provide the accompanying drawings and the following description for those skilled in the art to fully understand the present disclosure, and do not provide them to intend to limit the subject matter described in the scope of claims.

Exemplary Embodiment

In the present exemplary embodiment, a control device or the like that more easily acquires position information on a plurality of speakers used for presenting sound will be described. Specifically, the control device of the present exemplary embodiment more easily acquires the position information on the plurality of speakers used for presenting sound. The "position information" may be simply referred to as a "position".

Figure 1:
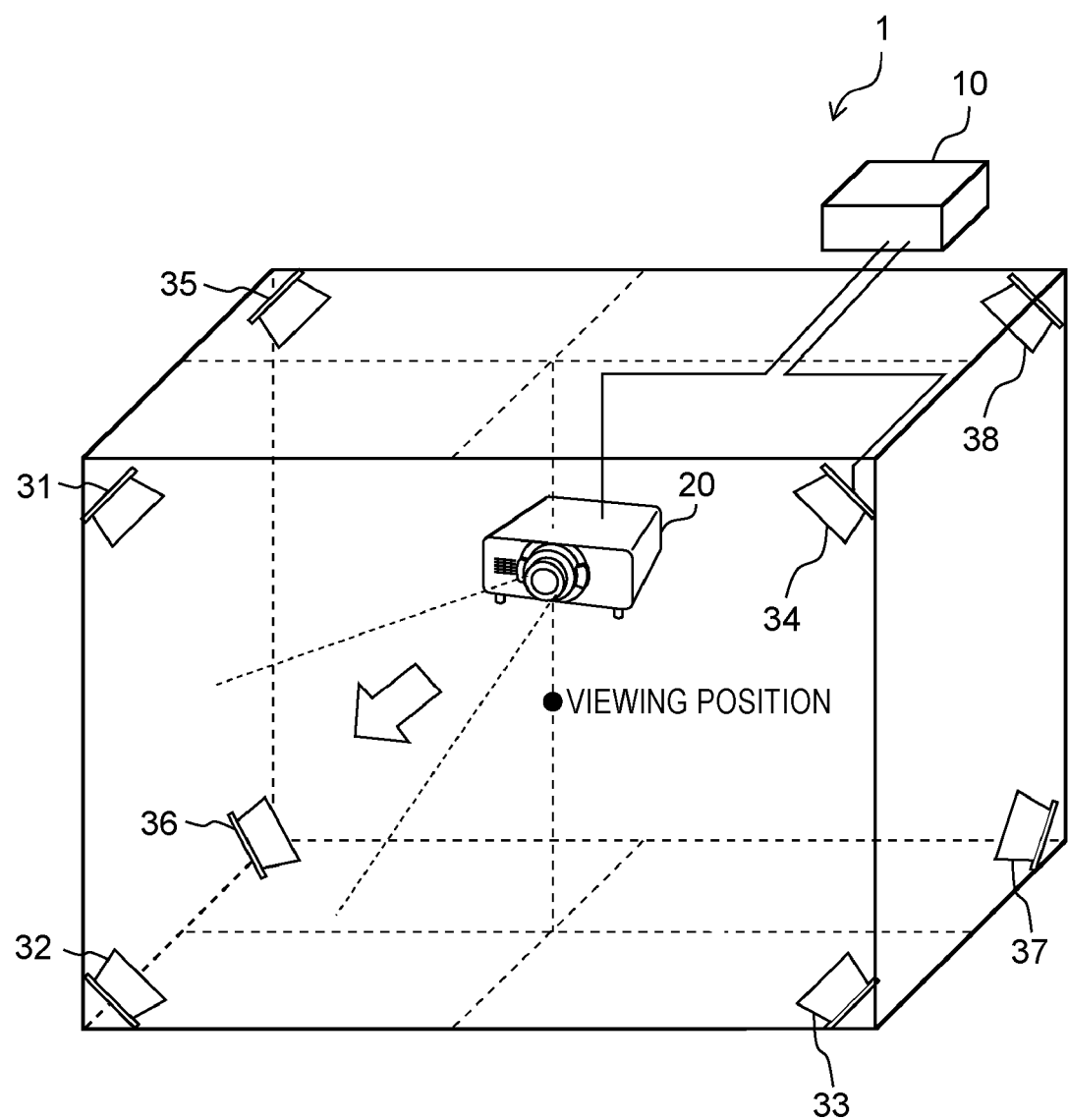
FIG. 1 is a schematic diagram illustrating a presentation system and a control device according to an exemplary embodiment.

FIG. 1 is a schematic diagram illustrating presentation system 1 and control device 10 according to the present exemplary embodiment.

Presentation system 1 presents sound in a space and displays an image in the space (e.g., a wall surface of the space) to allow a user in the space to view a stereophonic sound and a stereoscopic image.

As illustrated in FIG. 1, presentation system 1 includes control device 10, display device 20, and a plurality of speakers 31 to 38 (also referred to as plurality of speakers 31 and the like). Control device 10 may include the plurality of speakers 31 and the like.

Control device 10 controls display of an image with display device 20 and output of sound with the plurality of speakers 31 and the like. Control device 10 acquires image data to be displayed on display device 20 and presents a stereoscopic image to the user by allowing display device 20 to display the stereoscopic image after performing appropriate conversion on the acquired image data. Control device 10 also acquires an input sound source signal used to generate a drive sound source signal to be supplied to the plurality of speakers 31 and the like and presents stereophonic sound to the user by supplying the input sound source signal to the plurality of speakers 31 and the like after performing appropriate conversion on the acquired input sound source signal.

Control device 10 further acquires position information on the plurality of speakers 31 and the like. These kinds of processing will be described in detail later.

Control device 10 is communicably connected to display device 20, and controls display of an image with display device 20 via communication. Control device 10 is also connected to the plurality of speakers 31 and the like, and transmits a signal of sound to be output by the plurality of speakers 31 and the like through this connection. Control device 10 may be connected to display device 20 and the plurality of speakers 31 and the like in a wired or wireless manner. FIG. 1 illustrates only the connection between control device 10 and speaker 34 as the connection between control device 10 and the plurality of speakers 31, and does not illustrate another connection.

Display device 20 displays an image on a display surface to allow the user to visually recognize the image. The image displayed by display device 20 is based on the image data transmitted from control device 10. The image data transmitted from control device 10 is generated to allow the user to recognize the image data as a scene around the user. The user can recognize the image displayed around the user as the scene around the user by actually looking toward the image.

For example, the display device 20 displays images in all directions viewed from the user. The images are displayed in all the directions viewed from the user, so that the user can view not only an image in a front direction but also images in all the directions including a left-right direction, an upward direction, and the like by changing a viewing direction.

Alternatively, display device 20 may display an image that does not necessarily extend in all the directions as viewed from the user. In other words, display device 20 may display an image that is displayed in multiple directions viewed from the user, for example, and that is specifically displayed in the front direction and the left-right direction for the user.

For example, display device 20 is a projection device (projector) that projects an image on a wall surface of a space where the user exists, or a wall surface surrounding the user, and this configuration will be described as an example. This configuration may include a plurality of display devices 20 that project images on the wall surface. This configuration includes the wall surface that corresponds to the display surface. As another example, display device 20 may include a plurality of stationary display devices disposed surrounding the user. This configuration includes a display panel provided in a display, the display panel corresponding to the display surface.

The plurality of speakers 31 and the like constitute a group of speakers disposed at respective positions surrounding the user. For example, speaker 31 is disposed in the front and upper right direction as viewed from a position (also referred to as a viewing position) at which the user is assumed to be present for viewing. Similarly, speakers 32, 33, and 34 are respectively disposed in the front and lower right direction, the front and lower left direction, and the front and upper left direction, as viewed from the viewing position. Additionally, speakers 35, 36, 37, and 38 are respectively disposed in the rear and upper right directions, the rear and lower right directions, the rear and lower left directions, and the rear and upper left directions, as viewed from the viewing position.

The plurality of speakers 31 and the like output sounds that are based on the drive sound source signal transmitted from control device 10. The drive sound source signal transmitted from control device 10 is generated so that a listener perceives a stereoscopic sound image, or is generated so that the user recognizes that the drive sound source signal is output from sound sources at various positions. This drive sound source signal enables the user to listen to not only sounds reaching from positions where the plurality of speakers 31 and the like actually exist but also sounds reaching the user from all the directions.

Here, position information (specifically, an azimuth angle and an elevation angle) on the plurality of speakers 31 and the like viewed from the viewing position is less likely to be acquired by measurement or the like. This is because although the position information on the plurality of speakers 31 and the like may be determined in design, change in the viewing position also changes the position information on the plurality of speakers 31 and the like viewed from the viewing position. Reasons why the position information on the plurality of speakers 31 and the like viewed from the viewing position is less likely to be acquired by measurement or the like include the following: the azimuth angle or the elevation angle changes when the speaker position is physically changed; a large number of physical speakers or virtual speakers causes a complicated physical measurement; and a cumbersome calculation is required to convert a distance difference in each of the XYZ directions obtained from measured speaker positions and viewing position coordinates into the azimuth angle or the elevation angle.

Thus, a method for more easily acquiring position information on the plurality of speakers 31 and the like with control device 10 will be described.

Hereinafter, function of control device 10 will be described in detail.

Figure 2A:
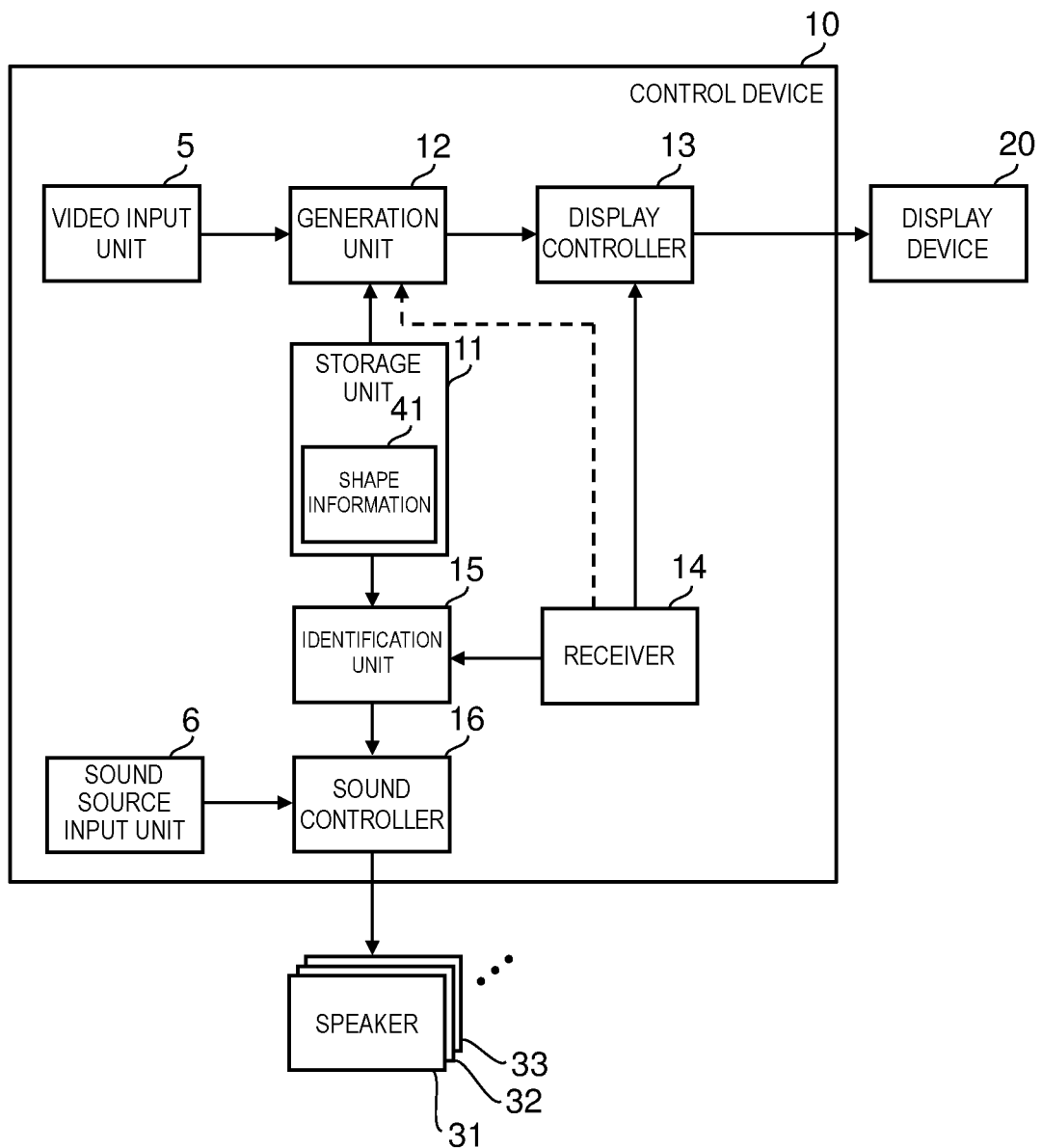
FIG. 2A is a block diagram illustrating a functional configuration of a control device according to an exemplary embodiment.
Figure 2B:
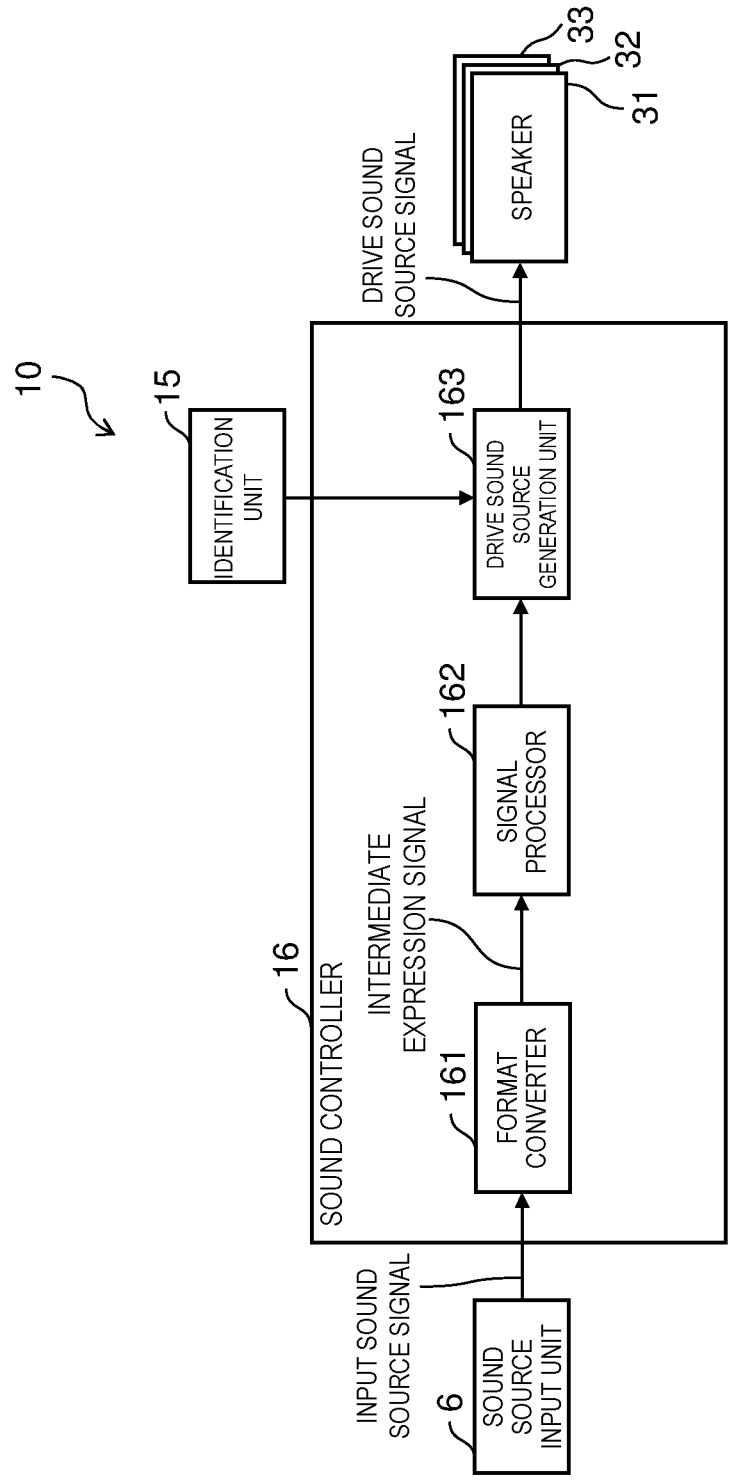
FIG. 2B is a block diagram illustrating a detailed functional configuration of a control device according to an exemplary embodiment.

FIG. 2A is a block diagram illustrating a functional configuration of control device 10 according to the present exemplary embodiment. FIG. 2B is a block diagram illustrating a detailed functional configuration of control device 10 according to the present exemplary embodiment. The functional configuration of control device 10 according to the present exemplary embodiment will be described with reference to FIGS. 2A and 2B.

As illustrated in FIG. 2A, control device 10 includes video input unit 5, sound source input unit 6, storage unit 11, generation unit 12, display controller 13, receiver 14, identification unit 15, and sound controller 16. Control device 10 includes the above-described functional units that can be implemented by executing a program with a central processing unit (CPU) (not illustrated) provided in control device 10 using a memory, unless otherwise described individually.

Video input unit 5 is a functional unit that acquires image data to be displayed on the display surface. Video input unit 5 acquires image data that is omnidirectional image data acquired by a camera (so-called omnidirectional camera or 360-degree camera) that acquires an omnidirectional image, for example. Video input unit 5 provides the acquired image data to generation unit 12. Video input unit 5 may be implemented as one function of generation unit 12.

Sound source input unit 6 is a functional unit that acquires sound data on sound to be output by presentation system 1. Sound source input unit 6 provides the acquired sound data to sound controller 16. Sound source input unit 6 may be implemented as one function of sound controller 16.

Storage unit 11 is a storage device that stores shape information indicating a shape of the display surface. The shape information may also include information indicating a viewing position. The shape information includes geometry information indicating the shape of the display surface, and specifically includes information that can specify a position, dimension, or angle of a surface constituting the display surface.

The display surface is a wall surface of a space in which the user is present, for example, and the shape information indicates a shape of the wall surface. For example, when the user is present in a rectangular parallelepiped space illustrated in FIG. 1, the shape information includes information specifying a position, dimension, or angle of each surface constituting the rectangular parallelepiped. Storage unit 11 is a memory or a storage.

Generation unit 12 is a functional unit that performs conversion processing using shape information on the image data acquired by video input unit 5 to generate display image data. The conversion processing using the shape information allows the user to view the image displayed on the display surface from the viewing position in an identical manner to when surroundings are viewed from the camera, and specifically includes geometry conversion using the shape information.

As a result of the conversion processing, generation unit 12 generates display image data to be displayed on display device 20. For a plurality of display devices 20, generation unit 12 generates display image data to be displayed on each of the plurality of display devices 20.

Display controller 13 is a functional unit that performs control of displaying the display image data generated by generation unit 12 on the display surface. Display controller 13 acquires the display image data generated by generation unit 12 and provides the display image data to display device 20. Display controller 13 is connected to display device 20 by conforming to a video transmission standard, and transmits the display image data to display device 20 through this connection. The video transmission standard is the high-definition multimedia interface (HDMI) standard, the HDMI being a registered trademark, or the analog RGB (VGA) standard, for example.

Receiver 14 is a functional unit that superimposes and displays a cursor on the displayed display image and receives position designation related to the plurality of speakers 31 and the like on the display image from the user who has visually recognized the cursor. Receiver 14 receives operation by the user using a user interface device such as a mouse or a touch panel. In response to the operation, receiver 14 performs control of displaying the cursor while superimposing the cursor on the display image displayed on the display surface. The above control may be performed on display controller 13 or generation unit 12. Specifically, receiver 14 may perform control of causing display controller 13 to perform processing of superimposing a cursor on the display image data acquired by display controller 13. Receiver 14 also may perform control of causing generation unit 12 to perform processing of superimposing a cursor on the image data acquired by generation unit 12 or the display image data being subjected to the conversion processing performed by generation unit 12, as control on generation unit 12.

When receiving operation of moving a cursor in a certain direction from the user, receiver 14 performs control of moving the cursor superimposed and displayed on the display surface in a direction corresponding to an operated direction in response to the operation. The cursor may be in any shape, such as a circular shape, a rectangular shape, an arrow shape, or a shape of another figure.

Receiver 14 receives position designation of the plurality of speakers 31 and the like by acquiring a position of the cursor when the cursor is superimposed on corresponding one of the plurality of speakers 31 and the like based on operation by the user. Specifically, receiver 14 receives designation of coordinate values (X, Y) indicating the position of the cursor on the display image.

Identification unit 15 is a functional unit that identifies a position in the space related to the plurality of speakers 31 and the like. Specifically, identification unit 15 calculates the position of the cursor in the space from the position designed by the user by referring to a correspondence relationship between positions in the image data before conversion and the display image data after the conversion in the conversion processing, and identifies the calculated position as the position in the space related to the plurality of speakers 31 and the like. As an example, the position information in the omnidirectional image includes an azimuth angle and an elevation angle when viewed from the viewing position.

When receiver 14 receives position designation of a speaker, identification unit 15 calculates a position of corresponding one of the plurality of speakers 31 and the like in the space as the position in the space related to the plurality of speakers 31 and the like.

Sound controller 16 is a functional unit that controls sound output of the plurality of speakers 31 and the like. Sound controller 16 processes sound data acquired by sound source input unit 6 using the position information in the space of the plurality of speakers 31 and the like to calculate a drive sound source signal to be supplied to each of the plurality of speakers 31 and the like.

When receiver 14 receives the position designation of a speaker, the sound controller 16 performs control of calculating the drive sound source signal to be supplied to each of the plurality of speakers 31 and the like based on the positions of the plurality of speakers 31 and the like in the space, the positions being identified by the identification unit 15, when the plurality of speakers 31 and the like present sound to the user, and causing the plurality of speakers 31 and the like to output the drive sound source signal. The expression of causing sound to be output is a concept including sound to be output at a volume of zero. This is because the sound at a volume of zero is considered to be output even when no sound is actually output. Sound controller 16 includes a part functioning as described above that corresponds to a first sound controller.

An example of a detailed configuration of sound controller 16 will be described with reference to FIG. 2B.

As illustrated in FIG. 2B, sound controller 16 includes format converter 161, signal processor 162, and drive sound source generation unit 163.

Format converter 161 is a functional unit that performs conversion processing from an A-format signal (described later) to a B-format signal (described later). Format converter 161 obtains the A-format signal as an input sound source signal from sound source input unit 6. The input sound source signal obtained by format converter 161 may be a directional microphone signal, an omnidirectional microphone signal, or a point sound source signal. The input sound source signal may be input by an offline input or a real-time input.

Signal processor 162 is a functional unit that performs signal processing on a B-format region, such as zoom and rotation processing.

The drive sound source generation unit 163 is a functional unit that calculates a drive sound source signal to be supplied to one speaker Si of the plurality of speakers 31 and the like.

Hereinafter, generation of the drive sound source signal to be supplied to each of the plurality of speakers 31 and the like, and sound output of the plurality of speakers 31 and the like, will be described.

Figure 3:
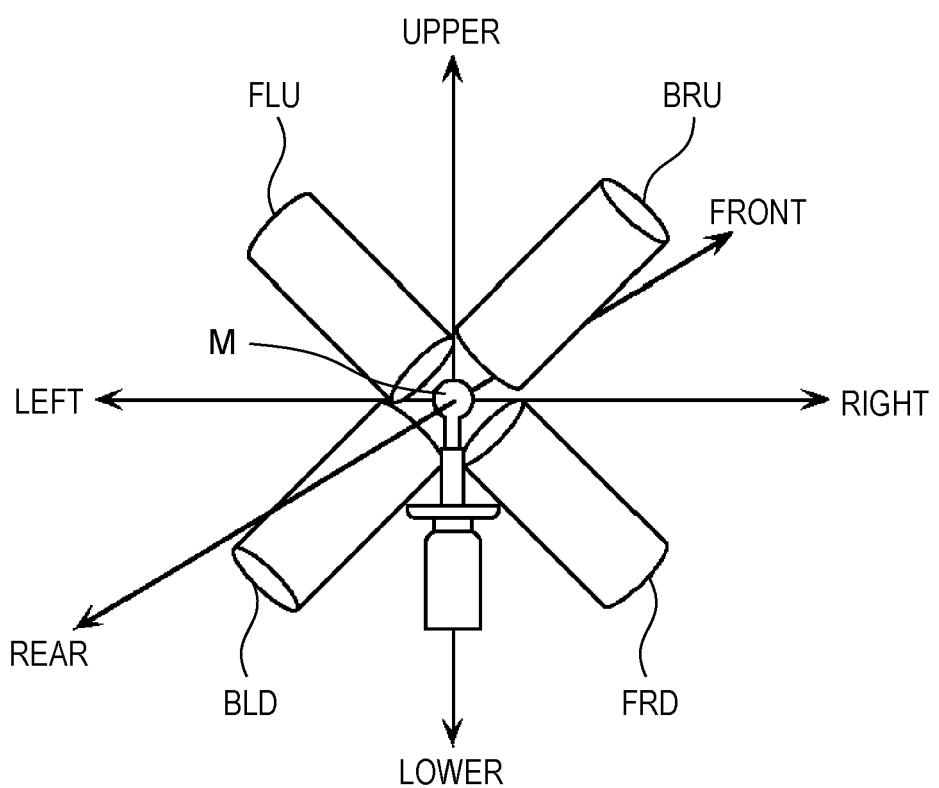
FIG. 3 is a conceptual diagram illustrating acquisition of a sound in a space with a microphone, according to an exemplary embodiment.

FIG. 3 is a conceptual diagram illustrating acquisition of a sound in a space with microphone M, according to the present exemplary embodiment. Microphone M illustrated in FIG. 3 is an ambisonic microphone (a 360-degree microphone, also called a surround microphone) that collects sounds coming from multiple directions.

Specifically, microphone M includes directional microphone elements that collect sounds in four directions of a front and upper left direction (FLU), a front and lower right direction (FRD), a rear and upper right direction (BRU), and a rear and lower left direction (BLD) when a first-order Ambisonics signal is generated from the collected signals, and these microphone elements express an input sound source signal indicating the collected sounds. The number of directions in which microphone M collects sound is not limited to four, and may be any number as long as the number is two or more. This case enables generating a second-order or higher Ambisonics signal from the collected signals in accordance with the number of elements. Alternatively, an array microphone also can be used in which an omnidirectional microphone element is disposed on a rigid sphere instead of the directional microphone element.

Sound controller 16 preliminarily acquires the input sound source signal collected by microphone M. This input sound source signal is also commonly referred to as an A-format signal.

Figure 4:
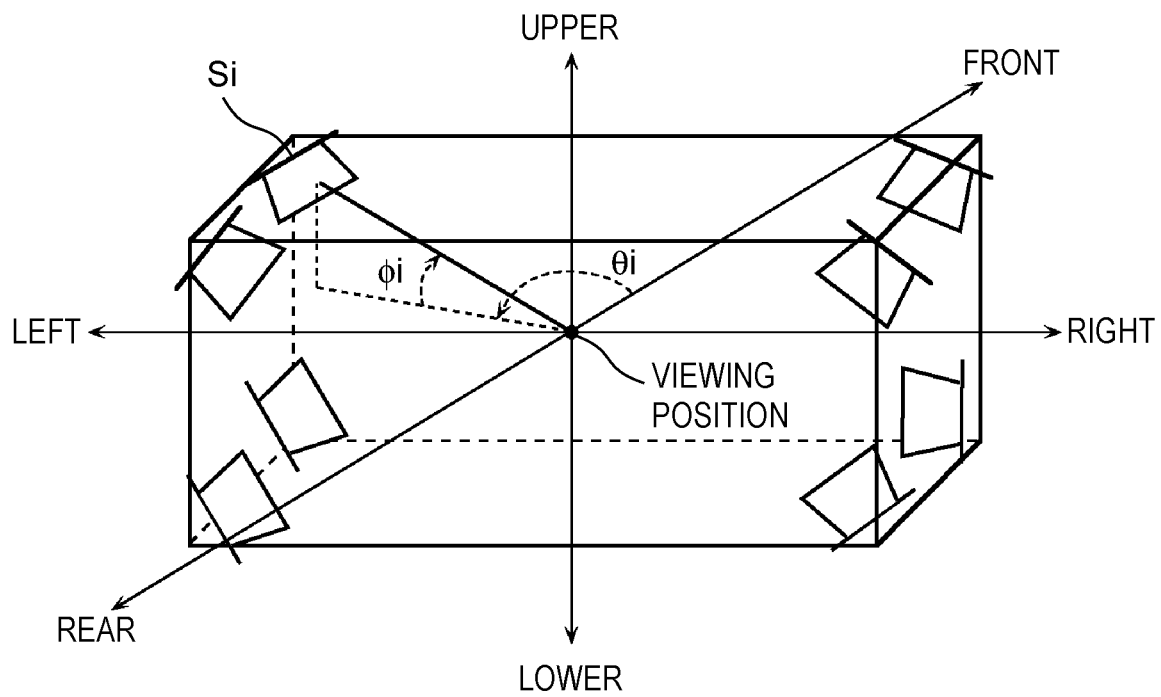
FIG. 4 is a conceptual diagram illustrating a method for calculating a sound output from a speaker according to an exemplary embodiment.

FIG. 4 is a conceptual diagram illustrating a method for calculating a drive sound source signal to be supplied to a speaker according to the present exemplary embodiment. The drive sound source signal (see FIG. 2B) to be supplied to the speaker is calculated by sound controller 16 based on a B-format signal, which is an intermediate expression signal converted from the A-format signal preliminarily acquired, by using position information on the speaker.

The conversion processing from the A-format signal to the B-format signal is performed by a well-known technique. This conversion processing is similar to that of the well-known technique, and thus a detailed description thereof will be omitted. The B-format signal of the first-order Ambisonics signal includes four pieces of data W (omnidirectional component), X (front-back spread component), Y (left-right spread component), and Z (up-down spread component).

Next, an example of processing of calculating the drive sound source signal to be supplied to each of the plurality of speakers 31 and the like from the B-format signal representing the first-order Ambisonics signal will be described.

Drive sound source signal Oi to be supplied to one speaker Si of the plurality of speakers 31 and the like illustrated in FIG. 1 is calculated by (Formula 1) below.

$$Oi = C \cdot W + \cos(\theta i) \cdot \cos(\phi i) \cdot X + \sin(\theta i) \cdot \cos(\phi i) \cdot Y + \sin(\phi i) \cdot Z \quad \text{(Formula 1)}$$

Here, C is a constant that determines ratios of W to X, Y, and Z. The B-format signal has components indicated as W, X, Y, and Z. The components of the B-format signal may be subjected to signal processing on the B-format region, such as rotation processing of coordinate axes or zoom processing, the components being indicated as W, X, Y, and Z. As illustrated in FIG. 4, $\theta i$ and $\phi i$ are respectively an azimuth angle and an elevation angle with respect to the front of a viewing position.

That is, drive sound source signal Oi (see FIG. 2B) to be supplied to speaker Si is calculated using the azimuth angle and the elevation angle of speaker Si. In this manner, sound controller 16 calculates the drive sound source signal to be supplied to each of the plurality of speakers 31 and the like using the azimuth angle and the elevation angle of the speaker.

Next, image data acquired by generation unit 12 and conversion processing performed by generation unit 12 will be described.

Figure 5:
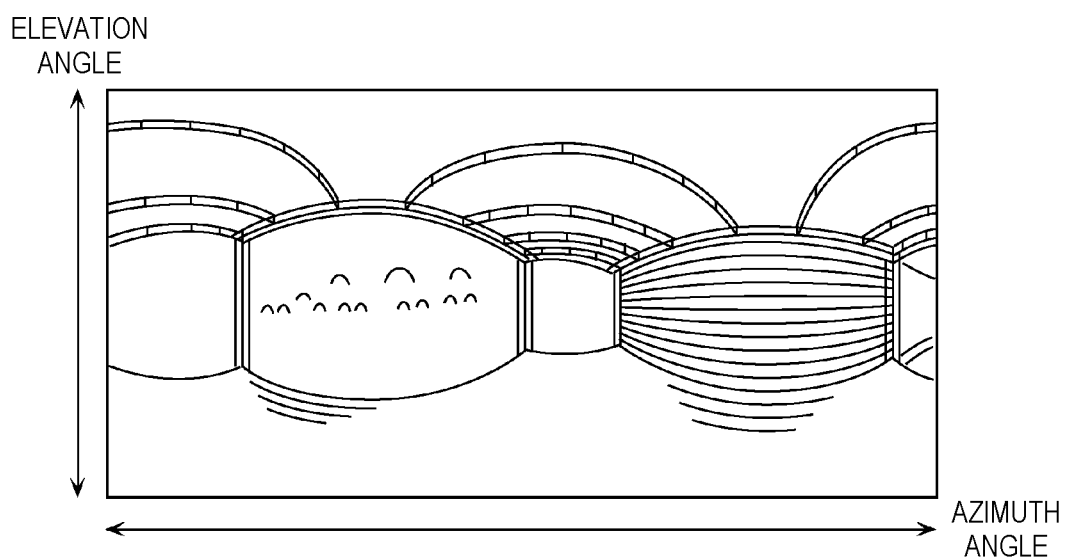
FIG. 5 is a conceptual diagram illustrating an image before conversion by a control device according to an exemplary embodiment.
Figure 6:
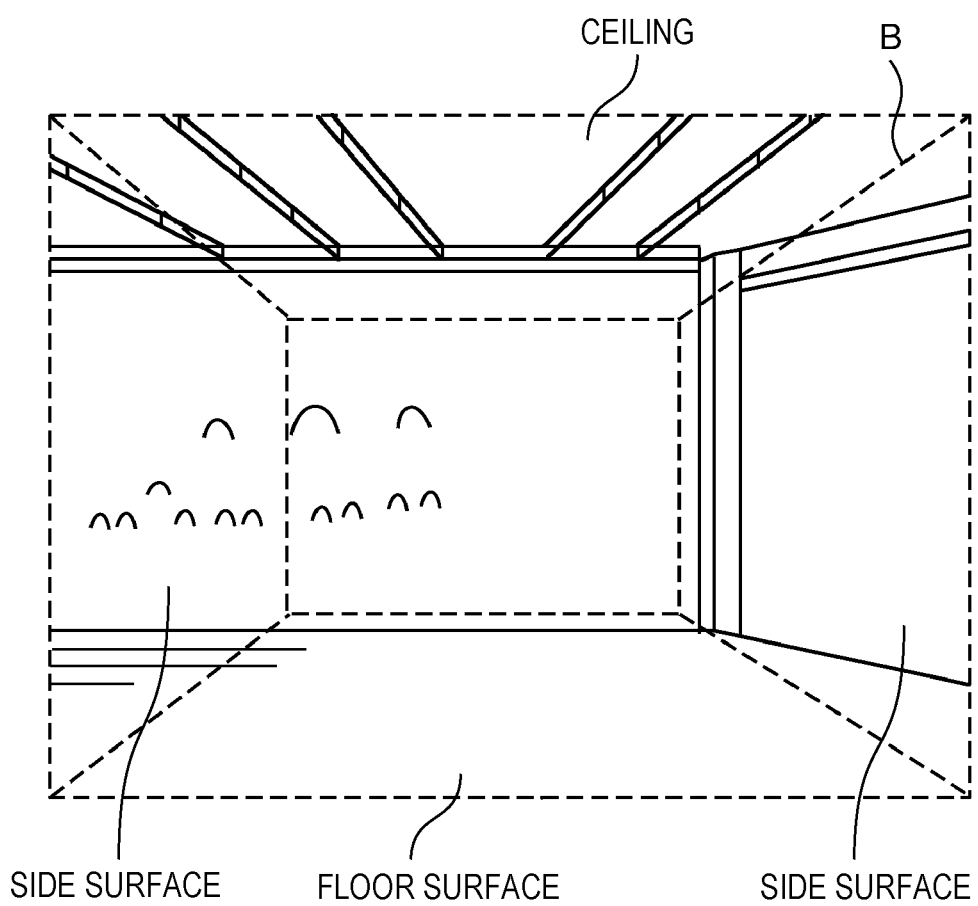
FIG. 6 is a conceptual diagram illustrating a state in which a display surface on which an image after the conversion by a control device according to an exemplary embodiment is displayed is viewed from a viewing position.

FIG. 5 is a conceptual diagram illustrating an image before conversion by control device 10 according to the present exemplary embodiment. FIG. 6 is a conceptual diagram illustrating a state in which a display surface on which an image after the conversion by control device 10 according to the exemplary embodiment is displayed is viewed from a viewing position. With reference to FIGS. 5 and 6, a method for converting an image with generation unit 12 will be described.

The image illustrated in FIG. 5 is an example of an omnidirectional image acquired by generation unit 12, and illustrates the omnidirectional image subjected to panoramic development. FIG. 5 indicates a lateral direction corresponding to the azimuth angle, and a vertical direction corresponding to the elevation angle. This image reflects front-rear, left-right, and up-down directions of a photographing position.

When generation unit 12 generates image data by converting the image illustrated in FIG. 5 with geometry conversion using the shape information and the image data projected on the display surface in a state is viewed from the viewing position, the state appears as illustrated in FIG. 6.

FIG. 6 illustrates a ceiling surface, side surfaces, and a floor surface of the space, and broken line B indicates a boundary of a wall surface of the space. For example, broken line B shows a boundary between the ceiling surface and each of the side surfaces, a boundary between the side surfaces, or a boundary between the floor surface and each of the side surfaces.

FIG. 6 also illustrates images displayed on the ceiling surface, the side surfaces, and the floor surface. The images displayed on the ceiling surface, the side surfaces, and the floor surface have no distortion when viewed from the viewing position by being subjected to conversion processing by display controller 13. Although no distortion when viewed from the viewing position as described above is ideal, the image may have slight distortion caused by positional displacement from the viewing position, an error in geometry information, a conversion error, or the like.

Figure 7:
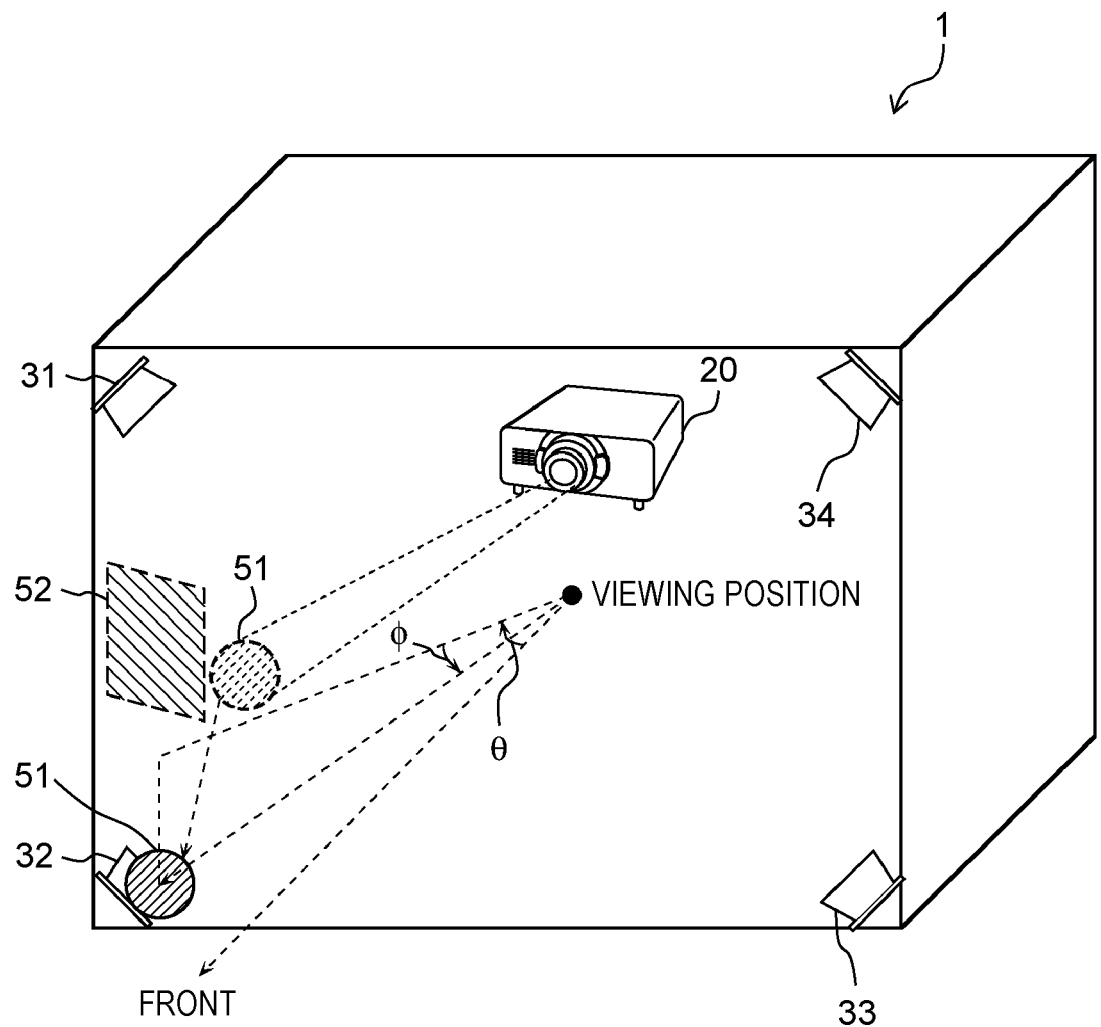
FIG. 7 is a schematic diagram illustrating a method for displaying a cursor and acquiring a position of a speaker using a control device according to an exemplary embodiment.

FIG. 7 is a schematic diagram illustrating a method for displaying a cursor and acquiring a position of a speaker using control device 10 according to the present exemplary embodiment. FIG. 7 does not illustrate rear speakers 35, 36, 37, and 38. Although FIG. 7 illustrates a state in which display device 20 displays a display image, the display image being displayed is not illustrated.

As illustrated in FIG. 7, receiver 14 superimposes and displays cursor 51 on the display surface under control of display controller 13. Cursor 51 is displayed on the display image in a superimposed manner.

When receiving operation of the user, receiver 14 displaces the displayed cursor in response to the received operation. For example, when receiving operation of moving a mouse downward with the user, receiver 14 moves cursor 51 superimposed and displayed on the display image downward under control of display controller 13.

The user performs operation of moving the cursor on receiver 14 while visually recognizing the position of the cursor, and superimposes cursor 51 on speaker 32. Then, the user performs operation (also referred to as selection operation) of selecting a current position of cursor 51 on receiver 14 while superimposing cursor 51 on speaker 32.

Receiver 14 acquires a position (specifically, coordinate values (X, Y)) of cursor 51 on the display image when the selection operation is performed. Identification unit 15 identifies the position (specifically, the azimuth angle and the elevation angle) of cursor 51 in the space as the position of the corresponding one of the plurality of speakers 31 and the like by referring to the correspondence relationship between the positions of the image data before conversion and the display image data after the conversion in the conversion processing. In this manner, identification unit 15 identifies positions (specifically, azimuth angles θ and elevation angles ϕ) of the plurality of speakers 31 and the like.

As with the above, control device 10 can also set sound parameters including delay or gain of the plurality of speakers 31 and the like. The sound parameters are required for adjusting a drive signal of a speaker, and may include a equalizer, a mute, a solo, or the like in addition to the delay or the gain. In this case, receiver 14 causes display controller 13 to superimpose and display an adjustment image for receiving designation of the sound parameters of a target speaker, which is one speaker of the plurality of speakers 31 and the like, on the display image, and receives the designation of the sound parameters of the target speaker from the user who has visually recognized the adjustment image. Then, sound controller 16 performs control of applying the sound parameters to a drive sound source signal to be supplied the specified target speaker in response to the designation and outputting the drive sound source signal with the applied sound parameters.

Examples of the adjustment image for receiving the designation of the sound parameters of the target speaker include adjustment image 52 for receiving designation of the delay or the gain illustrated in FIG. 7.

Figure 8:
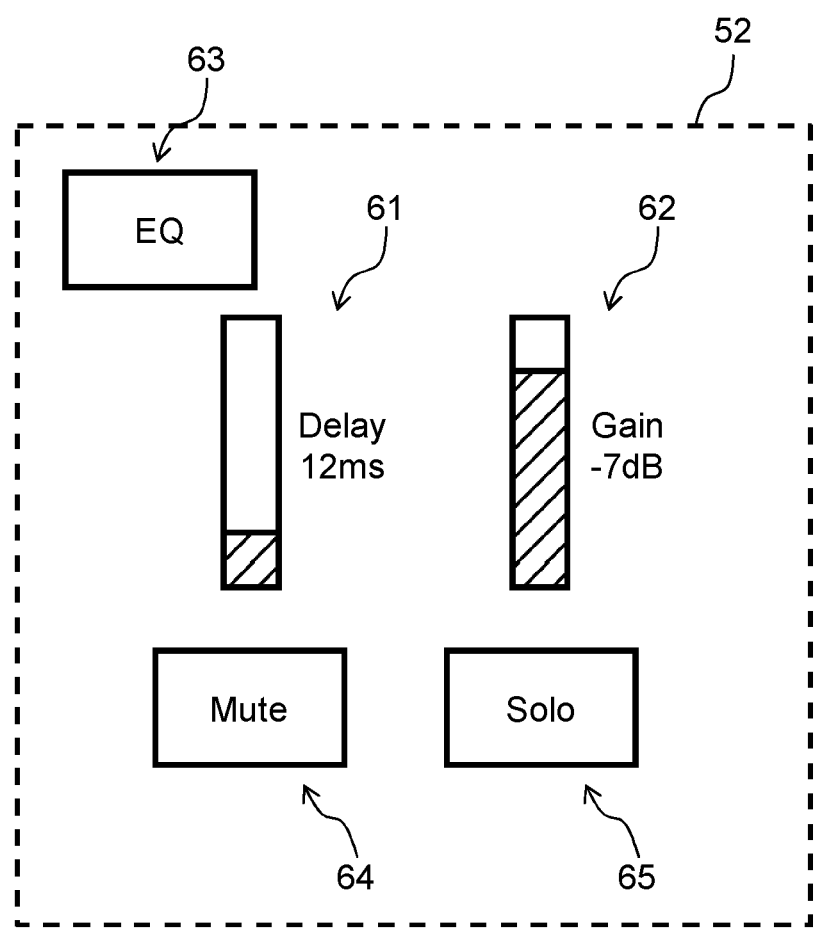
FIG. 8 is a schematic diagram illustrating an adjustment image of a delay and a gain displayed by a control device according to an exemplary embodiment.

FIG. 8 is a schematic diagram illustrating adjustment image 52 of the delay and the gain displayed by control device 10 according to the present exemplary embodiment.

As illustrated in FIG. 8, adjustment image 52 includes image 61 for adjusting the delay and image 62 for adjusting the gain. For example, when a bar in image 61 is operated upward based on operation of the user, the delay is increased, and when a bar in image 61 is operated downward, the delay is reduced. Similarly, when the bar in image 62 is operated upward based on operation of the user, the gain increased, and when the bar in the image 62 is operated downward, the gain is reduced. Adjustment image 52 may include only one of images 61 and 62.

The user can adjust the delay and the gain while viewing images 61, 62, and an adjustment result of the delay and the gain is applied to a sound output by sound controller 16.

When the equalizer is adjusted as a sound parameter, image 63 of the equalizer adjustment panel can be used. For example, when image 63 is operated, an image showing a panel for changing frequency characteristics is displayed. The panel for changing the frequency characteristic may be a panel for adjusting a gain for each band determined in advance like a graphic equalizer, or may be a parametric equalizer for adjusting various parameters (filter type, center frequency, Q value, gain, and the like) of a biquad filter.

When the mute or the solo is adjusted as a sound parameter, image 64 of a mute switch or image 65 of a solo switch can be used. For example, when image 64 of the mute switch or image 65 of the solo switch is operated, the mute or the solo is switched between ON and OFF.

Processing of control device 10 configured as described above will be described.

Figure 9:
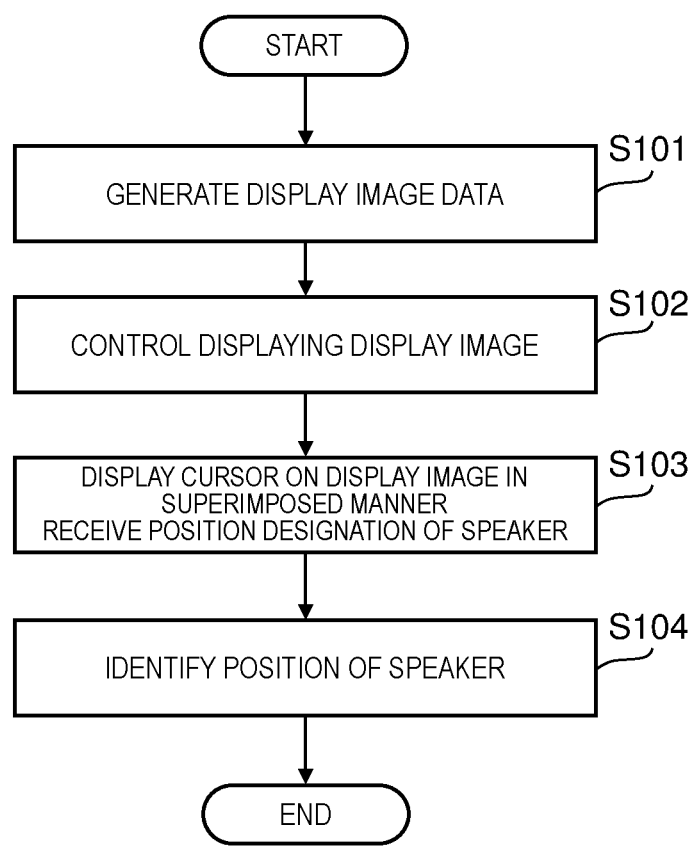
FIG. 9 is a flowchart illustrating a processing method performed by a control device according to an exemplary embodiment.

FIG. 9 is a flowchart illustrating a processing method performed by control device 10 according to the present exemplary embodiment. This processing method is performed by control device 10 to control sound presented to the user by the plurality of speakers 31 and the like disposed in the space.

As illustrated in FIG. 9, in step S101 (generation step), image data to be displayed on the display surface is acquired, and display image data is generated from the acquired image data by using conversion processing using shape information indicating a shape of the display surface.

In step S102 (display control step), control is performed to display a display image on the display surface using the display image data generated in the generation step.

In step S103 (reception step), the cursor is superimposed and displayed on the displayed display image, and position designation related to the plurality of speakers 31 and the like on the display image is received from the user who has visually recognized the cursor.

In step S104 (identification step), the position of the cursor in the space is calculated from the position designed by the user by referring to a correspondence relationship between positions in the image before conversion and the image after the conversion in the conversion processing, and the calculated position is identified as the position in the space related to the plurality of speakers 31 and the like.

As a result, control device 10 can more easily acquire position information on the plurality of speakers 31 and the like used for presenting the sound.

Identification unit 15 performs processing of calculating the position of the cursor in the space from position designed by the user by referring to the correspondence relationship between the positions in the image data before conversion and the display image data after the conversion in the conversion processing, the processing including a first example in which the position of the cursor in the space is calculated from the position designed by the user by using inverse conversion processing related to inverse conversion of the conversion processing performed by generation unit 12. The inverse conversion processing corresponds to processing of converting display image data into omnidirectional image data by geometry conversion using the shape information. Using this inverse conversion processing causes information indicating the position on the display image designated by the user to be converted into a position in an omnidirectional image.

Identification unit 15 performs processing of calculating the position of the cursor in the space from position designed by the user by referring to the correspondence relationship between the positions in the image data before conversion and the display image data after the conversion in the conversion processing, the processing including a second example of acquiring an azimuth angle and an elevation angle indicating the position of the cursor in the omnidirectional image when the cursor is superimposed on speaker 31 or the like. Although both the first example and the second example can be used when the inverse conversion processing can be performed, a method of the second example is effective when the inverse conversion processing is impossible or not defined. The method of the second example will be described with reference to FIG. 10.

Figure 10:
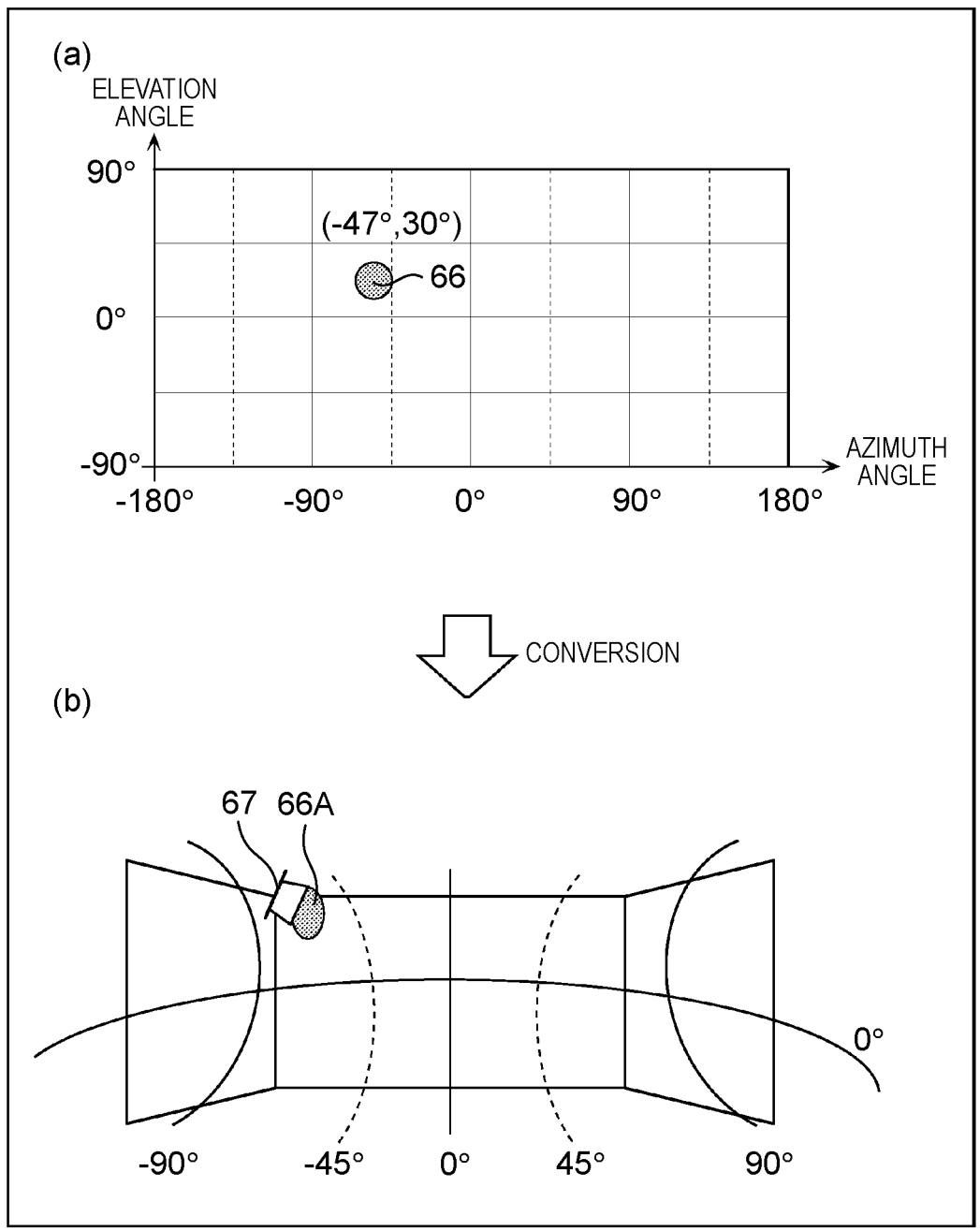
FIG. 10 is an explanatory diagram illustrating a first method for calculating a position of a cursor in a space according to an exemplary embodiment.
Figure 11:
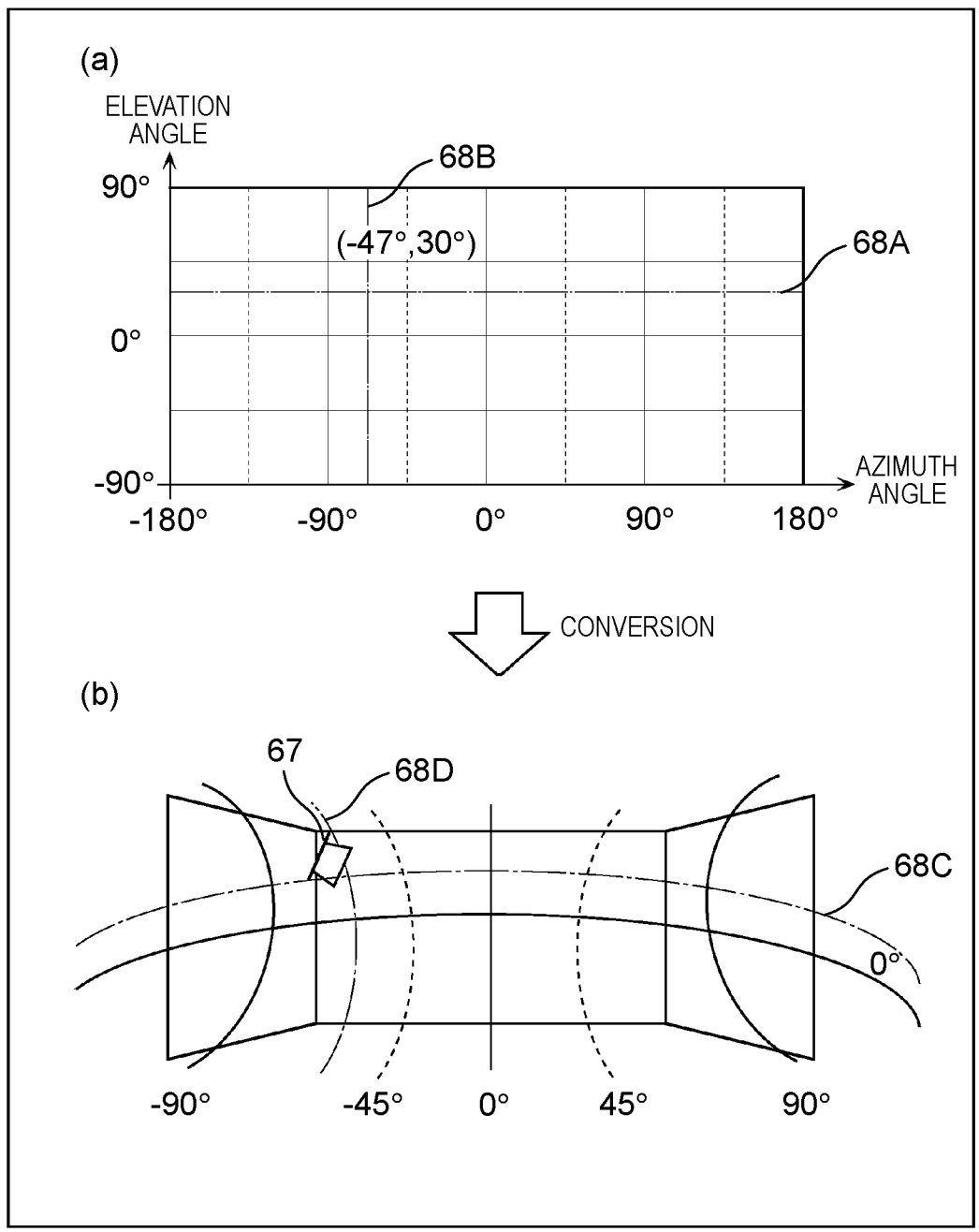
FIG. 11 is an explanatory diagram illustrating a second method for calculating a position of a cursor in a space according to an exemplary embodiment.

FIGS. 10 and 11 are each an explanatory diagram illustrating a method for calculating a position of the cursor in the space, according to the present exemplary embodiment. FIG. 10 has part (a) illustrating an omnidirectional image in which the horizontal axis indicates an azimuth angle and the vertical axis indicates an elevation angle. Cursor 66 is also displayed.

FIG. 10 has part (b) illustrating a state in which the omnidirectional image is displayed on the display surface. Cursor 66A is displayed at a position corresponding to that of cursor 66 on the display surface.

The user views a scene illustrated in part (b) of FIG. 10 and operates cursor 66A to superimpose cursor 66A on speaker 67. Identification unit 15 acquires an azimuth angle and an elevation angle at a position of cursor 66 when cursor 66A is superimposed on speaker 67 (see part (b) of FIG. 10), thereby acquiring the position of the cursor in the space (see part (a) of FIG. 10).

Cursor 66A illustrated in part (b) of FIG. 10 is deformed by geometry conversion. Specifically, cursor 66 expressed as a substantially perfect circle in part (a) of FIG. 10 is expressed as an ellipse in part (b) of FIG. 10. To prevent a cursor image from deforming as described above, a position may be designated by an intersection of horizontal line 68A and vertical line 68B on an omnidirectional image (see parts (a) and (b) of FIG. 11) instead of cursors 66, 66A. At this time, a line corresponding to horizontal line 68A is displayed as line 68C on the display surface, and a line corresponding to vertical line 68B is displayed as line 68D on the display surface. The user can designate a position using the intersection of lines 68C and 68D. This way enables a cursor image to be prevented from being deformed as illustrated in part (b) of FIG. 10.

Modification of Exemplary Embodiment

In the present modification, a control device or the like that more easily acquires position information on the plurality of speakers used for presenting sound will be described. Specifically, the control device of the present modification more easily acquires a position of a virtual speaker constituted by the plurality of speakers disposed.

The present modification shows a real speaker, or a speaker simply referred to as a speaker in the above exemplary embodiment that is referred to as a physical speaker, and a speaker virtually constituted by the physical speaker that is referred to as a virtual speaker.

Figure 12:
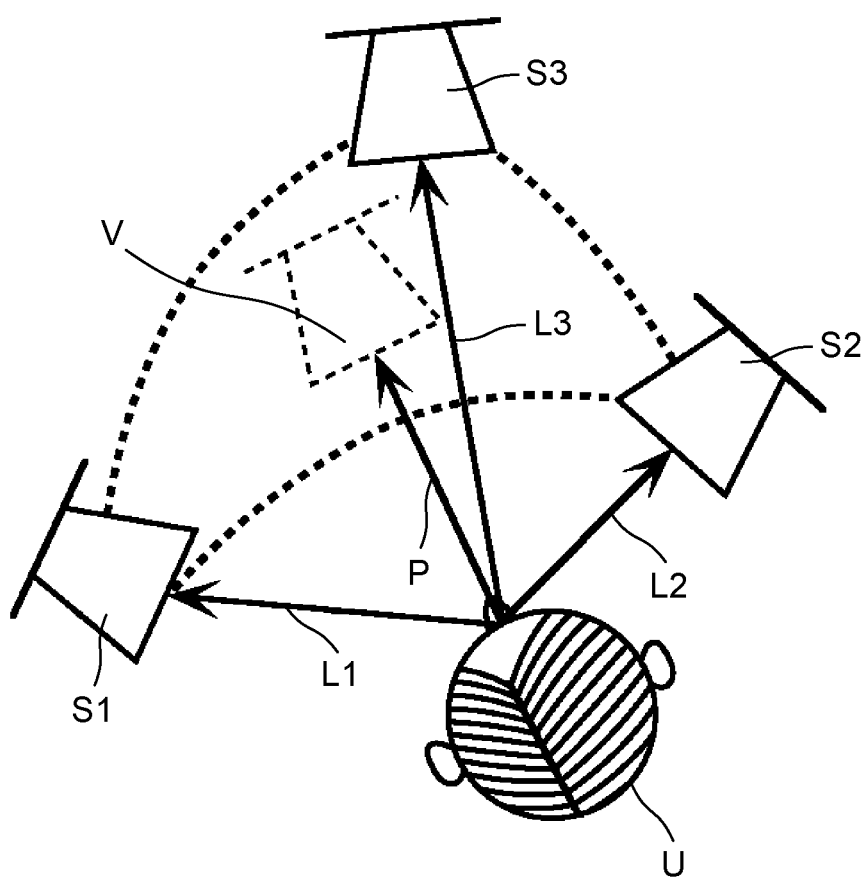
FIG. 12 is an explanatory diagram of a virtual speaker according to a modification of an exemplary embodiment.

FIG. 12 is an explanatory diagram of a virtual speaker virtually constituted by physical speakers. Applicable examples of a method for configuring the virtual speaker include vector base amplitude panning (VBAP).

FIG. 12 illustrates physical speakers S1, S2, S3 existing around user U. At this time, appropriate adjustment for gains of physical speakers S1, S2, S3 enables virtual speaker V to be virtually constituted by physical speakers S1, S2, S3. Then, the user U recognizes that a sound source is at a position of virtual speaker V, or recognizes virtual speaker V as a virtual sound source.

More specifically, direction vector P of virtual speaker V from the viewing position is expressed as (Formula 2) below that uses direction vectors L1, L2, L3 of corresponding physical speakers S1, S2, S3 from the viewing position, and gains g1, g2, g3.

$$P = g1 \cdot L1 + g2 \cdot L2 + g3 \cdot L3 \qquad \text{(Formula 2)}$$

As a result, virtual speaker V is virtually formed at an appropriate position in a convex hull defined by physical speakers S1, S2, S3, physical speakers S1, S2, S3 respectively having gains g1, g2, g3 that are appropriately set. When the virtual speaker outputs sound, physical speakers S1, S2, S3 also can output sound. In this case, each of physical speakers S1, S2, S3 outputs a sound acquired by synthesizing a sound to be output by the physical speaker and a sound contributing to the virtual speaker.

As described above, forming virtual speaker V requires direction vector P of virtual speaker V from the viewing position, or an azimuth angle and an elevation angle of the virtual speaker. However, it is difficult for the user to set the azimuth angle and the elevation angle of the virtual speaker by designating an angle, for example.

Thus, a method for more easily acquiring a position of a virtual speaker with control device 10 will be described.

In principle, the control device according to the present modification is similar in configuration to control device 10 according to the exemplary embodiment. Hereinafter, a part different in function from control device 10 according to the exemplary embodiment will be mainly described.

Receiver 14 acquires a position of a cursor that is superimposed on a position of each of one or more virtual speakers virtually constituted by the plurality of speakers 31 and the like based on operation of the user, and thus receives position designation of the one or more virtual speakers.

Identification unit 15 calculates the position of each of the one or more virtual speakers in the space based on the position designation of each of the one or more virtual speakers on the display image received by receiver 14. Identification unit 15 also identifies the position of each of the one or more virtual speakers as a position in the space related to the plurality of speakers 31 and the like.

The sound controller 16 calculates a drive sound source signal to be supplied to each of the plurality of speakers 31 and the like when a sound is presented to the user by the plurality of speakers 31 and the like, and the one or more virtual speakers, based on the position of each of the one or more virtual speakers in the space identified by identification unit 15, and performs control of causing each of the plurality of speakers 31 and the like to output the drive sound source signal. Sound controller 16 includes a part functioning as described above that corresponds to a second sound controller.

Figure 13:
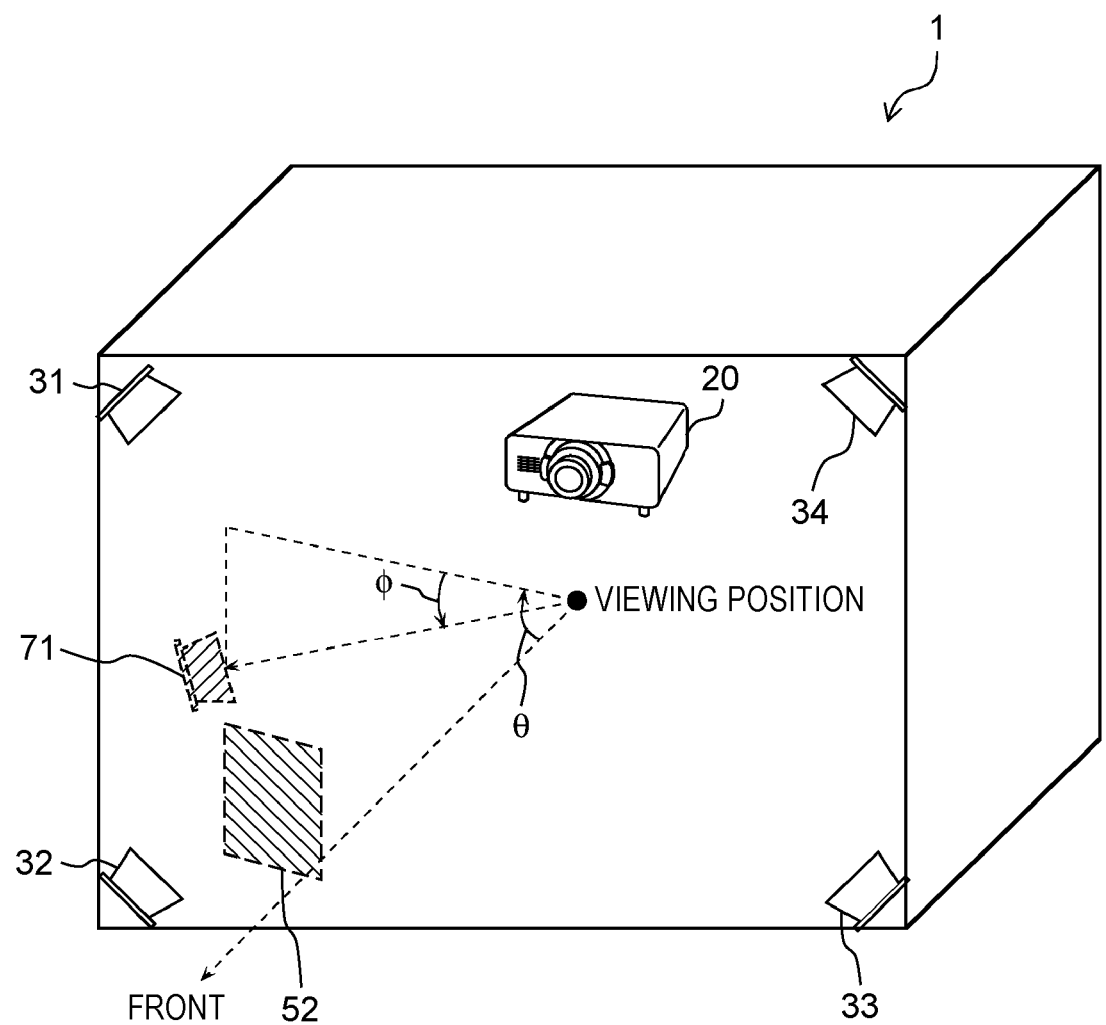
FIG. 13 is a schematic diagram illustrating a method for acquiring a position of a virtual speaker using a control device according to a modification of an exemplary embodiment.

With reference to FIG. 13, a specific configuration will be described.

FIG. 13 is a schematic diagram illustrating a method for acquiring a position of a virtual speaker with control device 10 according to the present exemplary embodiment. As in FIG. 7, FIG. 13 does not illustrate rear speakers 35, 36, 37, 38.

As illustrated in FIG. 13, receiver 14 superimposes and displays cursor 71 on a display image displayed on a display surface under control of display controller 13. Cursor 71 may have any shape including a shape imitating a speaker, for example. Use of cursor 71 having a shape imitating a speaker offers an advantage that the user can intuitively recognize that position designation of a virtual speaker is performed.

When receiving operation of the user, receiver 14 displaces the displayed cursor in response to the received operation.

The user superimposes cursor 71 on the display image at a position where the virtual speaker is desired to be disposed by performing operation of moving cursor 71 on receiver 14 while visually recognizing a position of cursor 71, and performs operation of selecting a current position of the cursor (also referred to as selection operation) on receiver 14.

Receiver 14 acquires a position of the cursor on the display image when the selection operation is performed. Then, receiver 14 identifies the position (specifically, the azimuth angle $\theta$ and the elevation angle $\phi$) of the cursor in the space as the position of the virtual speaker to be formed by referring to the correspondence relationship between the positions of the image data before conversion and the display image data after the conversion in the conversion processing with respect to the acquired position of the cursor on the display image. As described above, receiver 14 identifies the position, or the azimuth angle and the elevation angle of the virtual speaker to be formed.

As with the exemplary embodiment described above, control device 10 can also set sound parameters including delay or gain of the virtual speaker. In this case, sound controller 16 causes a sound to be output, the sound being acquired by applying a sound parameter related to the designation to a sound output from the virtual speaker in which the sound parameters are set. At this time, adjustment image 52 illustrated in FIG. 7 can be used for receiving the designation of the sound parameter.

Control device 10 can also receive designation of a physical speaker constituting the virtual speaker. In this case, receiver 14 receives position designation of each of a plurality of designated speakers, which are a plurality of speakers, virtually constituting one virtual speaker included in the one or more virtual speakers among the plurality of speakers by acquiring a position of the cursor superimposed on the corresponding one of the plurality of designated speakers based on the operation of the user. Sound controller 16 calculates a drive sound source signal to be supplied to the plurality of speakers 31 and the like to cause one or more virtual speakers to be virtually formed using the plurality of designated speakers for which receiver 14 has received designation, and causes the calculated drive sound source signal to be output. When positions of the respective physical speakers have already been calculated, receiver 14 can also receive position designation of the plurality of designated speakers by reading out information indicating the calculated positions of the respective physical speakers.

As a result, the control device can more easily receive not only position information on a virtual speaker used for presenting sound but also designation of a physical speaker constituting the virtual speaker.

As described above, the control device according to each of the present exemplary embodiment and the present modification controls sound to be presented to the user by a plurality of speakers disposed in a space. The control device includes: a generation unit that acquires image data to be displayed on a display surface and generates display image data from the acquired image data by using conversion processing using shape information indicating a shape of the display surface; a display controller that displays a display image on the display surface by using the display image data generated by the generation unit; a receiver that causes a cursor to be superimposed and displayed on the display image displayed, and receives position designation related to the plurality of speakers on the display image from the user who has visually recognized the cursor; and an identification unit that calculates a position of the cursor in the space from the position designation of the user by referring to a correspondence relationship between the image data before the conversion processing and the display image data after the conversion processing, and that identifies the calculated position of the cursor as a position related to the plurality of speakers.

This configuration enables the control device to acquire the positions related to the plurality of speakers, or the positions in the space (i.e., the position with respect to the space) by referring to the correspondence relationship between the image data before conversion and the display image data after the conversion in the conversion processing. Here, the control device acquires the information on the positions of the plurality of speakers (e.g., an azimuth angle and an elevation angle) using the position that is intuitively designated on the image by the user at the viewing position when viewed from the user, so that input of information on the positions of the plurality of speakers (e.g., a numerical value indicating an azimuth angle or the like) is not required to be directly received from the user. Thus, the control device can more easily acquire position information on the plurality of speakers used for presenting the sound.

The receiver may receive, as the position designation related to the plurality of speakers, position designation of each of the plurality of speakers by acquiring the position of the cursor when the cursor is superimposed on each of the plurality of speakers based on operation of the user, the identification unit may identify positions of the plurality of speakers as the position related to the plurality of speakers, and the control device may further include a first sound controller that calculates a drive sound source signal to be supplied to each of the plurality of speakers when the plurality of speakers present the sound to the user based on the positions of the plurality of speakers identified by the identification unit and that controls output of the plurality of speakers.

This configuration allows the control device to acquire a position of corresponding one of the plurality of speakers for presenting the sound to the user by using a position intuitively designated on an image by the user. The acquired position of the corresponding one of the plurality of speakers is used to calculate a drive sound source signal to be supplied to the corresponding one of the plurality of speakers at the time of presenting the sound. Thus, the control device can more easily acquire position information on the plurality of speakers used for presenting the sound.

The receiver may also superimpose and display an adjustment image on the display image, the adjustment image being for receiving designation of a sound parameter of a target speaker among the plurality of speakers, and receive the designation of the sound parameter of the target speaker from the user who has visually recognized the adjustment image, and the first sound controller may control output of the target speaker after applying the sound parameter according to the designation to the drive sound source signal to be supplied to the target speaker.

This configuration enables the control device to receive the designation of the sound parameter of the target speaker from the user who has visually recognized the adjustment image displayed on the display surface. Here, the user designates the sound parameter of the target speaker using a designated value of the sound parameter intuitively designated on the adjustment image displayed on the display surface, so that input of the designated value of the sound parameter is not required to be directly received from the user. Thus, the control device can more easily acquire not only the position information on the plurality of speakers used for presenting the sound but also sound parameters of the plurality of speakers.

The receiver may also receive, as the position designation related to the plurality of speakers, position designation of each of one or more virtual speakers by acquiring a position of the cursor superimposed on each of the one or more virtual speakers based on operation of the user, the one or more virtual speakers virtually being constituted by the plurality of speakers, the identification unit may calculate a position of each of the one or more virtual speakers in the space based on the position designation of each of the one or more virtual speakers received by the receiver, and identify the position of each of the one or more virtual speakers as a position related to the plurality of speakers, and the control device may further include a second sound controller that calculates a drive sound source signal to be supplied to each of the plurality of speakers when the plurality of speakers and the one or more virtual speakers present the sound to the user based on the position of each of the one or more virtual speakers identified by the identification unit and that controls output of the plurality of speakers.

This configuration allows the control device to acquire a position of a virtual speaker for presenting the sound to the user by using a position intuitively designated on an image by the user. The acquired position of the virtual speaker is used to calculate a drive sound source signal to be supplied to the virtual speaker at the time of presenting the sound. Thus, the control device can more easily acquire position information on the virtual speaker used for presenting the sound.

The receiver may also receive, as the position designation related to the plurality of speakers, position designation of each of a plurality of designated speakers among the plurality of speakers by acquiring a position of the cursor superimposed on each of the plurality of designated speakers based on the operation of the user, the plurality of designated speakers virtually constituting one virtual speaker included in the one or more virtual speakers, and the second sound controller may calculate the drive sound source signal to be supplied to each of the plurality of speakers to cause the one or more virtual speakers to be virtually formed using the plurality of designated speakers for which the receiver has received designation.

This configuration enables the control device to receive designation of a physical speaker virtually constituting a virtual speaker from the user using the cursor displayed on the display surface. Here, the user designates the physical speaker by moving the cursor displayed on the display surface, so that information designating the physical speaker is not required to be separately received from the user. Thus, the control device can more easily receive not only position information on a virtual speaker used for presenting sound but also designation of a physical speaker constituting the virtual speaker.

The position related to the plurality of speakers may include an azimuth angle and an elevation angle of corresponding one of the plurality of speakers when viewed from a viewing position of the user.

This configuration allows the control device to acquire the azimuth angles and the elevation angles, which are information on the positions of the plurality of speakers, using a position that is intuitively identified on an image by the user at the viewing position when viewed from the user, so that these kinds of information are not required to be directly received from the user. Thus, the control device can more easily acquire position information on the plurality of speakers used for presenting the sound.

The control device may further include the plurality of speakers.

This configuration enables the control device to more easily acquire the position information on the plurality of speakers used for presenting the sound, and enables presenting the sound with the plurality of speakers.

A processing method for a control device according to the present disclosure is a processing method for a control device that controls sound to be presented to a user with a plurality of speakers disposed in a space, the processing method including: a generation step of acquiring image data to be displayed on a display surface and generating display image data from the acquired image data by using conversion processing using shape information indicating a shape of the display surface; a display control step of displaying a display image on the display surface by using the display image data generated in the generation step; a reception step of superimposing and displaying a cursor on the display image displayed, and receiving position designation related to the plurality of speakers on the display image from the user who has visually recognized the cursor; and an identification step of calculating a position of the cursor in the space from the position designation of the user by referring to a correspondence relationship between the image data before the conversion processing and the display image data after the conversion processing, and identifying the calculated position of the cursor as a position related to the plurality of speakers.

This method achieves an effect similar to that of the control device.

A storage medium storing a program according to the present disclosure is for causing a computer to execute the above processing method of information.

This method achieves an effect similar to that of the control device.

As described above, the exemplary embodiment has been described to exemplify the techniques in the present disclosure. To this end, the accompanying drawings and detailed description are provided.

Thus, the components illustrated in the accompanying drawings and described in the detailed description may include not only components essential for solving the problems, but also components non-essential for solving the problems, being illustrated to exemplify the above technique. For this reason, it should not be immediately construed that those non-essential components are essential only based on the fact that those non-essential components are illustrated in the accompanying drawings or described in the detailed description.

The exemplary embodiments described above are intended to illustrate the technique in the present disclosure, and thus various changes, replacements, additions, eliminations, and the like may be made within the scope of claims and equivalents thereof.

The present disclosure is applicable to a control device that controls sound to be presented to a user by the plurality of speakers.

What is claimed is:

1. A control device that controls sound to be presented to a user with a plurality of speakers disposed in a space, the control device comprising:
   a generation unit that acquires image data to be displayed on a display surface and generates display image data from the acquired image data by using conversion processing using shape information indicating a shape of the display surface;
   a display controller that displays a display image on the display surface by using the display image data generated by the generation unit;
   a receiver that causes a cursor to be superimposed and displayed on the display image displayed, and receives position designation related to the plurality of speakers on the display image from the user who has visually recognized the cursor; and
   an identification unit that calculates a position of the cursor in the space from the position designation of the user by referring to a correspondence relationship between the image data before the conversion processing and the display image data after the conversion processing, and that identifies the calculated position of the cursor as a position related to the plurality of speakers.

2. The control device according to claim 1, wherein
   the receiver receives, as the position designation related to the plurality of speakers, position designation of each of the plurality of speakers by acquiring the position of the cursor when the cursor is superimposed on each of the plurality of speakers based on operation of the user,
   the identification unit identifies positions of the plurality of speakers as the position related to the plurality of speakers, and
   the control device further includes a first sound controller that calculates a drive sound source signal to be supplied to each of the plurality of speakers when the plurality of speakers present the sound to the user based on the positions of the plurality of speakers identified by the identification unit and that controls output of the plurality of speakers.

3. The control device according to claim 2, wherein
   the receiver superimposes and displays an adjustment image on the display image, the adjustment image being for receiving designation of a sound parameter of a target speaker among the plurality of speakers, and receives the designation of the sound parameter of the target speaker from the user who has visually recognized the adjustment image, and
   the first sound controller controls output of the target speaker after applying the sound parameter according to the designation to the drive sound source signal to be supplied to the target speaker.

4. The control device according to claim 1, wherein
   the receiver receives, as the position designation related to the plurality of speakers, position designation of each of one or more virtual speakers by acquiring a position of the cursor superimposed on each of the one or more virtual speakers based on operation of the user, the one or more virtual speakers virtually being constituted by the plurality of speakers,
   the identification unit calculates a position of each of the one or more virtual speakers in the space based on the position designation of each of the one or more virtual speakers received by the receiver, and identifies the position of each of the one or more virtual speakers as the position related to the plurality of speakers, and
   the control device further includes a second sound controller that calculates a drive sound source signal to be supplied to each of the plurality of speakers when the plurality of speakers and the one or more virtual speakers present the sound to the user based on the position of each of the one or more virtual speakers identified by the identification unit and that controls output of the plurality of speakers.

5. The control device according to claim 4, wherein
   the receiver receives, as the position designation related to the plurality of speakers, position designation of each of a plurality of designated speakers among the plurality of speakers by acquiring a position of the cursor superimposed on each of the plurality of designated speakers based on the operation of the user, the plurality of designated speakers virtually constituting one virtual speaker included in the one or more virtual speakers, and
   the second sound controller calculates the drive sound source signal to be supplied to each of the plurality of speakers to cause the one or more virtual speakers to be virtually formed using the plurality of designated speakers for which the receiver has received designation.

6. The control device according to claim 1, wherein the position related to the plurality of speakers includes an azimuth angle and an elevation angle of corresponding one of the plurality of speakers when viewed from a viewing position of the user.

7. The control device according to claim 1, further comprising the plurality of speakers.

8. A processing method for a control device that controls sound to be presented to a user with a plurality of speakers disposed in a space, the processing method comprising:
   acquiring image data to be displayed on a display surface and generating display image data from the acquired image data by using conversion processing using shape information indicating a shape of the display surface;

displaying a display image on the display surface by using the display image data generated during the acquiring of the image data;

superimposing and displaying a cursor on the display image displayed, and receiving position designation related to the plurality of speakers on the display image from the user who has visually recognized the cursor; and calculating a position of the cursor in the space from the position designation of the user by referring to a correspondence relationship between the image data before the conversion processing and the display image data after the conversion processing, and identifying the calculated position of the cursor as a position related to the plurality of speakers.

9. A storage medium storing a program for causing a computer to execute the processing method for a control device according to claim 8.

* * * * *